United States Patent [19]

Babcock

[11] 4,288,901

[45] Sep. 15, 1981

[54] METHOD OF MANUFACTURING AND CALIBRATING A DISPLACEMENT MEASURING SENSOR

[76] Inventor: Clarence O. Babcock, 5 S. Flower, Lakewood, Colo. 80226

[21] Appl. No.: 52,471

[22] Filed: Jun. 27, 1979

Related U.S. Application Data

[62] Division of Ser. No. 790,013, Apr. 22, 1977, Pat. No. 4,170,897.

[51] Int. Cl.³ .............................................. B23P 17/00
[52] U.S. Cl. ....................................... 29/407; 29/173; 140/89; 72/371; 72/378
[58] Field of Search .................... 29/173, 407; 72/371, 72/378; 73/DIG. 1, 778; 84/199; 140/89

[56] References Cited

U.S. PATENT DOCUMENTS

| | | | |
|---|---|---|---|
| 1,422,993 | 7/1922 | Larned | 29/173 X |
| 1,615,790 | 1/1927 | Forbes et al. | 29/173 X |
| 2,728,278 | 12/1955 | Dvorak | 84/199 |
| 3,605,544 | 9/1971 | Kondo | 84/199 |
| 3,683,480 | 8/1972 | Deming | 29/173 |

FOREIGN PATENT DOCUMENTS

| | | | |
|---|---|---|---|
| 152735 | 8/1953 | Australia | 84/199 |
| 593089 | 2/1978 | U.S.S.R. | 29/173 |

*Primary Examiner*—Ervin M. Combs

*Attorney, Agent, or Firm*—Schwartz, Jeffery, Schwaab, Mack, Blumenthal & Koch

[57] ABSTRACT

A tensioned helical wire for use as a displacement sensor. The sensor made of high strength piano wire is attached at its ends to two anchors which in turn are attached to or are a part of the object or objects to be tested. In the preferred embodiment the sensor has straight ends which are attached to two small anchor blocks. These blocks are then attached to the test object. The displacement range and sensitivity of the sensor can be controlled by the initial geometry selected. If an initial tension applied is small, the sensor has a very large response range that is about fifty times that of a straight wire sensor. If a large initial tension is applied, the helical shape approaches that of a straight sensor and has a displacement range only a few times that of a straight wire sensor. If the sensor has a large displacement range, the sensitivity is much less than that of a straight wire sensor and if the sensor has a small range the sensitivity is comparable to that of the straight wire sensor. When in place, a readout system can be used to pluck the wire sensor to determine its initial vibratory mode. Should a sensor length change occur, this can be interpreted as a displacement change by using calibration results obtained during the manufacture of the sensor or during the installation process. Subsequent readings made by the readout system can be used to measure on a continuing basis the resulting displacement behavior.

1 Claim, 23 Drawing Figures

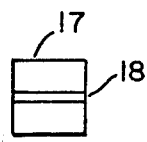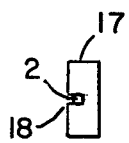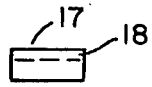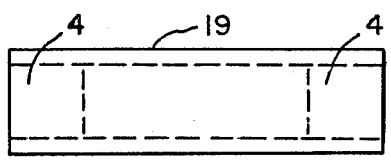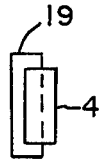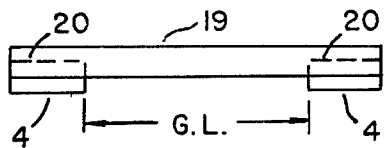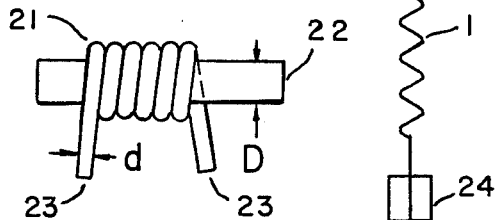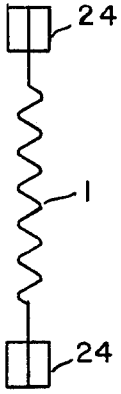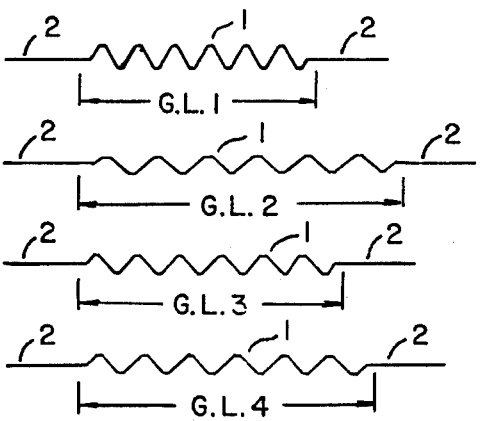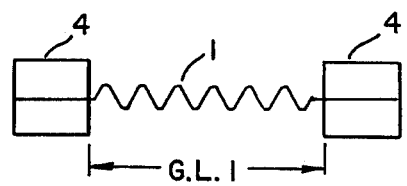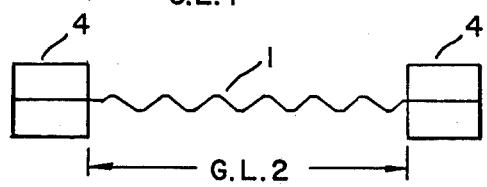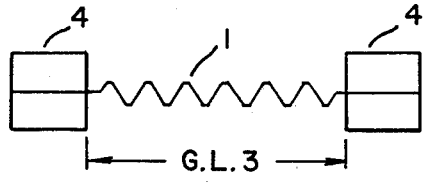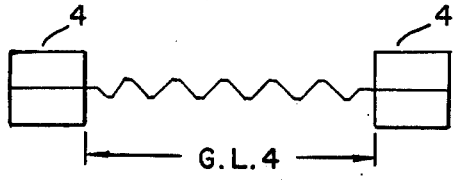

4,288,901

METHOD OF MANUFACTURING AND CALIBRATING A DISPLACEMENT MEASURING SENSOR

This is a division of application Ser. No. 790,013, filed Apr. 22, 1977, U.S. Pat. No. 4,170,897.

BACKGROUND OF THE INVENTION

1. Field of the Invention

A vibratory wire displacement sensor of helical shape whose mode of vibration can be read out to indicate the displacement behavior between the anchored ends.

2. Description of Prior Art

The use of vibrating wire displacement gages per se is old as evidenced by such references as U.S. Pat. No. 3,675,474 to R. D. Browne. My invention employs a similar principle of operation but by using a different method of construction is able to provide a much more versitile sensor than the straight wire sensor. A straight wire of high tensile strength can elongate about 0.35 percent of its initial length before breaking. This restricts its use to what is known as the infinitesimal range in which displacements of the order of micro inches per inch are to be measured. If displacements greater than 0.35 percent are to be measured some other method is needed. This is commonly done with linear voltage differential transformers. These units are expensive when compared to the cost of a vibrating wire sensor. In addition, if straight wire sensors are used for small displacements and linear voltage differential transformers are used for large displacements, two readout systems must be purchased. In addition, the particular range of displacements is built into the linear voltage differential transformer. The helical wire sensor range and sensitivity can be established at the time of the test by the user. Because of the extremely low cost of the helical sensor it can compete commercially with any other displacement or strain sensor now on the market. The helical wire was tested with a low voltage plucking system owned by the United States Government entitled "Vibrating Wire Readout Meter". The readout meter was invented by William V. Bailey while working as a Creare Incorporated employee on a United States Bureau of Mines contract. This meter is disclosed in U.S. Pat. No. 3,889,525. The prior art stressed the need for the vibrating wire to be straight to avoid multiple readings in U.S. Pat. No. 3,411,347 to J. Wirth et al. In another U.S. Pat. No. 3,963,082 to Meier straight wire vibratory sensors are used for weighing purposes. In this patent a number of springs of helical shape are used to linearize the straight vibrating wire response. The straight wire sensors and not the springs are made to vibrate.

SUMMARY OF THE INVENTION

A vibratory helical wire sensor for measuring displacements. The sensor after manufacture as a close helical coil is elongated to a selected geometry to establish a displacement sensitivity range. The coil is calibrated to establish the vibratory mode vs the displacement behavior. The sensor is tensioned and the ends are attached to two points on the same body or to two points one each on two different bodies. An initial vibratory mode is recorded and changes in mode with displacement are determined.

The principle objective of this invention is an improved vibrating wire sensor.

DESCRIPTION OF THE DRAWINGS

FIG. 13 shows the top view of an anchor block with a small slot for receiving the end 2 of the sensor of FIG. 1.

FIG. 14 shows the end view of the slotted anchor block of FIG. 13 with the end of sensor of FIG. 1 in place.

FIG. 15 shows the side view of the FIG. 13 anchor block with open wire groove.

FIG. 16 shows the FIG. 14 view after the wire groove is crimped shut to securely anchor the end of the FIG. 1. sensor.

FIG. 17 shows the top view of a gage block used to place anchor blocks the required distance apart and to bond them to the surface of the test object.

FIG. 18 shows the end view of the gage block of FIG. 17.

FIG. 19 shows the side view of the gage block of FIG. 17 holding anchor blocks.

FIG. 20 shows a method of manufacturing the sensor by winding a small diameter wire around a cylindrical mandrel to produce a helical coil.

FIG. 21 shows the helical coil of FIG. 20 being stretched by tension or displacement means to create the sensor of FIG. 1.

FIG. 22 shows the procedure used to calibrate the helical sensor before it is attached to anchor blocks or to the test object.

FIG. 23 shows the procedure used to calibrate the helical sensor after it has been attached to anchor blocks but before the blocks are attached to the test object.

DETAILED DESCRIPTION OF THE PREFERRED EMBODIMENTS

Figure 1:
FIG. 1 shows an unmounted vibratory wire displacement sensor with straight ends.
Figure 2:
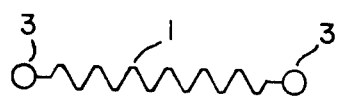
FIG. 2 shows an unmounted vibratory wire displacement sensor with circular ends.
Figure 3:
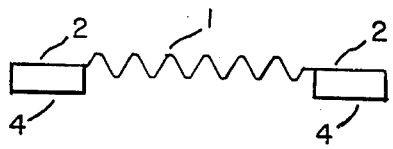
FIG. 3 shows a side view of the sensor of FIG. 1 attached to unmounted anchor blocks.
Figure 4:
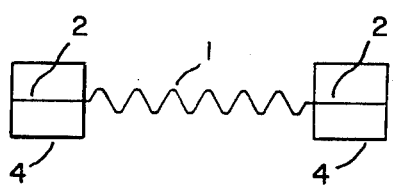
FIG. 4 shows a top view of the sensor of FIG. 1 attached to unmounted anchor blocks.
Figure 5:
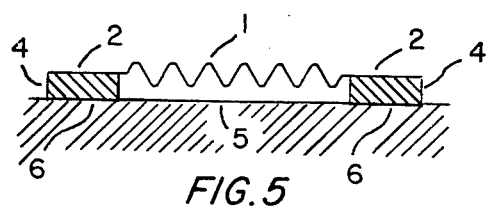
FIG. 5 shows a side view of the FIG. 3 assembly mounted on the surface of a test object after the sensor is tensioned.
Figure 6:
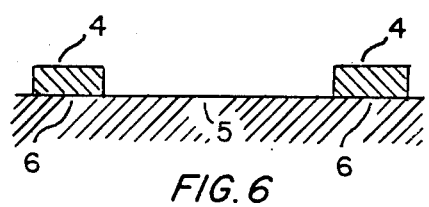
FIG. 6 shows two anchor blocks without sensor attached to the surface of the test object.
Figure 7:
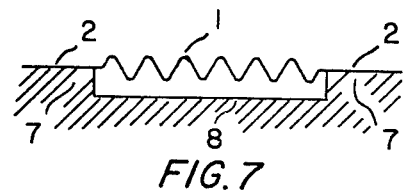
FIG. 7 shows a section normal to the surface of the test object in which the shape of the object itself provides the required anchor supports and relief for the helical length of the sensor to vibrate without interference.
Figure 8:
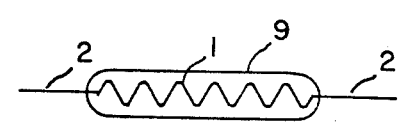
FIG. 8 shows the top view of FIG. 1 sensor attached directly to the surface of the test object in a slot cut into the object with an end mill to provide room for the sensor to vibrate freely without touching the test object except at the ends.
Figure 9:
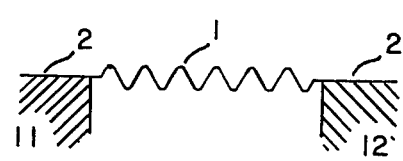
FIG. 9 shows the tensioned sensor of FIG. 1 attached to two separate objects to measure the displacement between them.
Figure 10:
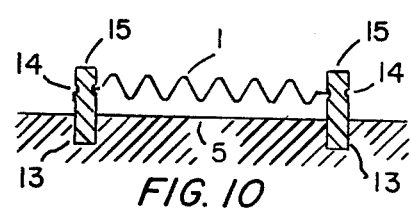
FIG. 10 shows a section through pins of circular section placed in drill holes in the test object, the pins supporting a tensioned FIG. 2 sensor.
Figure 11:
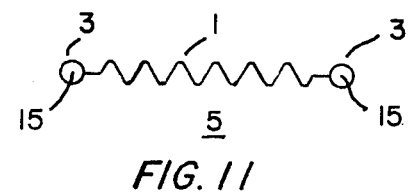
FIG. 11 shows the top view of the pin and sensor assembly of FIG. 10.
Figure 12:
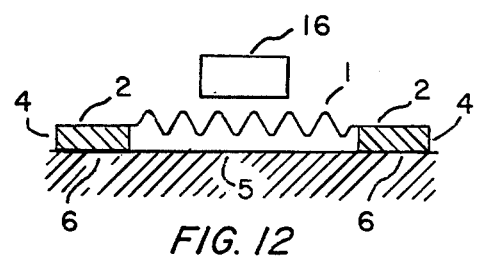
FIG. 12 shows the mounted tensioned sensor of FIG. 5 with wire plucking and readout instrumentation representation.

FIG. 1 shows one embodiment of a helical vibratory wire displacement sensor. The sensor consists of a helical portion 1 and two straight colinear ends 2. If the sensor is tensioned between two points of support and made to vibrate in a transverse direction at its resonant frequency, that frequency can be determined by instrumentation and used to measure the distance between the points of support. If the distance changes because the body to which it is attached deforms this can be measured. If the ends 2 are attached to two separate bodies the rigid body displacement between the bodies can be measured. FIG. 2 shows a second embodiment of a helical vibratory wire displacement sensor. The sensor consists of a helical portion 1 and two circular ends 3. In the sensors of both FIG. 1 and FIG. 2 the coiled portion 1 may have from one to many turns and the coiled portion 1 need not extend from one anchor to the other but may do so. One method of mounting sensors of FIG. 1 is to use the anchor blocks 4 of FIG. 3 and FIG. 4 to which the ends of the sensor 2 can be rigidly attached. Any method of attachment that results in a rigid connection to the anchor blocks can be used. The sensor ends 2 could be attached to the anchor blocks 4 by using epoxy or other adhesive, welding, soldering, clamping, or crimping. In FIG. 3 and FIG. 4 the sensor ends 2 are attached to the blocks 4 before the blocks 4 are attached to the test object. In FIG. 5 the anchor blocks 4 have been displaced to produce a tensile stress in the sensor 1 before the blocks 4 are attached at 6 to the surface of the test object 5. In FIG. 6 the anchor blocks 4 have been attached without sensor to the surface of the test object 5 at the lower surface of the block at 6. In FIG. 7 the test object is of such shape that the sensor ends 2 can be attached to the object itself while allowing the vibratory part of the sensor 1 room to operate without touching the object beneath at 8. This could be in the form of a groove cut into the test object. One groove shape that could be used is that of FIG. 8. This groove shape 9 has been successfully used with a straight vibratory wire sensor and this use is described in U.S. Pat. No. 3,914,992. The groove shape 9 is conveniently cut with an end mill of 0.125 inch diameter. The ends of the sensor 2 can be bonded to the anchor sites 7 or can be crimped into two small colinear wire grooves cut into the surface along the centerline of the slot 9 as in the patent just cited. In FIG. 9 the sensor is attached to two separate bodies 11 and 12 which can displace relative to one another and this displacement is to be measured. The displacement results in a change in the sensor tensile stress which in turn results in a change in the resonant vibratory frequency of the sensor. In FIG. 10 two holes 13 have been drilled normal to the surface of the test object 5. Two cylindrical pins 15 with annular grooves 14 to hold the ends 3 of the FIG. 2 sensor are mounted in these holes so that they are rigidly attached to the test object. The attachment can be by friction, epoxy or other adhesive, or a threaded pin and tapped hole. The pins are placed at some selected distance apart so that the FIG. 2 sensor is appropriately tensioned when the ends 3 are placed in the annular grooves of these pins. The circular ends 3 may be bonded with epoxy to the pins so as to establish a vibratory length that corresponds to the spacing between the pins. In FIG. 11, the top view of FIG. 10, the surface of the test object 5, the ends of the pins 15 and the FIG. 2 sensor are shown. FIG. 12 shows the location of a wire plucking magnet connected to a readout instrument shown symbolically as 16. One anchor system proven to work well is described in U.S. Pat. No. 3,914,992 where the slots are cut into the body itself and these slots are then crimped shut to anchor the ends of a straight wire sensor. Anchor blocks with wire anchor slots are shown in FIGS. 13, 14, 15, and 16. The slots in the blocks 17 in these figures are denoted by 18. The wire used in tests to date to make the sensors of FIG. 1 has been of 0.009 inch diameter 302 stainless or conventional piano wire. The wire anchor slot 18 has been 0.010 inch wide and 0.028 inch deep. The ends 2 of the sensor of FIG. 1 are placed in the bottom of the slot 18 and the slot is forced to flow shut plastically by means of a wedge shaped tool with a blunt end that is 0.050 inch wide. The sensor ends 2 are then surrounded by anchor block metal holding the sensor end 2 securely as in FIG. 16. The holding force on the wire can be calculated by the information given in U.S. Pat. No. 3,914,992. In many applications for displacement measurements a standard gage length is used. This can be accomplished by the gage block 19 of FIG. 17. This block has two openings of rectangular shape 20 into which the anchor blocks 4 are placed. This block may be magnetic so that if the blocks 4 are made of steel they will remain in place in the gage block 19. The block 19 has a selected gage length called G.L. which spaces the blocks 4 the required distance apart. If adhesive material such as a cyanoacrylate cement or epoxy is spread over the lower surface of the blocks 4 and then this surface is pressed against the surface of the test object 5 the region 6 in FIG. 5 will become rigidly attached to the test object when the adjesive hardens. The gage block 19 is removed and reused. Gage blocks of several different lengths can also be used to calibrate the sensor response.

The vibratory wire helical displacement sensors of FIG. 1 are manufactured in the following manner as shown in FIG. 20. Piano wire 23 of 0.009 inch diameter is wound into a helical coil 21 about a cylindrical mandrel 22 of selected diameter. In tests to date a range of sizes from 0.020 inch to 0.050 inch has been tried with this wire size. A diameter of 0.025 inch has worked well although other sizes are also all right. In FIG. 20 the wire diameter is denoted by d and the mandrel diameter by D. By changing d and D a wide variety of coil geometries and flexibilities is possible. The ends of the coil 23 are attached to means 24 for stretching the coil and changing its geometry, as shown in FIG. 21. A straight wire sensor has a displacement range of about 0.0024 inch in a 0.75 inch gage length corresponding to a vibrational frequency range of 2000 to 6667 cycles per second. This is a 0.32 percent change in the gage length. By contrast, a variety of helical coil displacement sensors tested had a displacement range of 1 to 15 percent or more of the gage length. This displacement range was established by the magnitude of the force applied to elongate and to establish the initial geometry of the sensor of FIG. 21. If a force is applied that is nearly the breaking strength of the wire, a displacement of about 1 percent of the gage length results. Even under these stress conditions the helical sensor retains some of its helical shape. If ten or twelve turns are used and a small tensile force is applied the sensor has a finite range displacement of perhaps 15 percent. The flexibility of the helical sensor is defined to be the relative displacement for a given gage length and applied tensile force compared to the displacement for a straight vibratory wire for the same conditions. Flexibilities in the range 3.4 to 1015 were observed in tests. That is, the helical sensors elongated 3.4 to 1015 times as much as the straight wire sensor for the same gage lengths and tensile forces applied. The flexible helical sensor has a range and corresponding vibratory frequency that needs to be stablished by a calibration process. In FIG. 22 the calibration procedure for the FIG. 1 sensor which is unmounted is described. The initial gage length is called G.L. 1. The sensor is stretched by a force or displacement means to a second gage length G.L. 2 which is the largest value that may be used and is not to be exceeded in use. This is required because it establishes the elastic range of the sensor. The larger the tensile force or displacement applied the more nearly straight the sensor and the smaller the displacement range. If the G.L. 2 is small, the sensor remains very flexible and the displacement range within the elastic limit of the wire material is very large. The sensitivity of the sensor is related to the displacement range. As the displacement range decreases the sensitivity increases and approaches that of a straight wire sensor just before the sensor is broken in tension. On the other hand if the displacement range is large the sensitivity decreases. It becomes necessary therefore to select the wire geometry before use to determine what the best combination of displacement and sensitivity will be. The meter reading is taken for the G.L. 2 chosen. The tensile force in the sensor is reduced to allow the sensor to shorten to a third gage length G.L. 3 where a second meter reading is taken. A fourth gage length G.L. 4 is chosen between the gage lengths G.L. 2 and G.L. 3. the sensor is attached with this gage length to the anchor blocks 4, to the anchor blocks 17, or directly to the test object as in FIG. 7 or to test objects as in FIG. 9. While the sensor ends shown in FIG. 22 are straight as in FIG. 1, item 2, the sensor of FIG. 2 could be used in essentially the same way and could be anchored additionally by pins 15 in FIG. 10. The calibration described in FIG. 22 could be done by the manufacturer before sale to customers or could be calibrated by the customer. This calibration could be performed by a displacement tool not described that has vernier or micrometer displacement means to measure the gage lengths to at least 0.001 inch and more accurately if necessary. This could be done by attaching the sensor ends 2 or 3 to the jaws of a vernier caliper with a screw fine adjustment feed. The sensor ends 2 could be held by clamping means that secure the ends 2 only during the calibration process. The sensor is then tensioned and attached to two gage blocks as in FIG. 6, the tension being adjusted by force or displacement means while the wire is tuned to give the initial reading desired. In this way a desired G.L. and vibratory mode can be chosen. Another calibration procedure is illustrated in FIG. 23. In this figure the sensor is attached to gage blocks 4 before the blocks are attached to the test object. The same procedure is followed as for FIG. 22 but in this case the sensor with G.L. 4 is mounted directly to the test object as in FIG. 5. In this case the gage length G.L. 4 is not specified in advance and for many applications this approach will be preferred since any gage length can be chosen as long as it is known. In the FIG. 23 calibration approach the blocks 4 are detachably mounted to a displacement or force means to provide the four gage lengths shown. In this figure G.L. 1 is selected during the manufacture of the sensor. The G.L. 2 has a greater displacement than G.L. 1, G.L. 3 or G.L. 4 and a vibratory frequency or period is determined. The G.L. 3 is chosen so that the displacement is less than G.L. 2 and enough different than G.L. 2 that the vibrational mode of these two lengths can accurately define the sensor behavior vs. displacement.

The displacement of a straight tensioned vibratory steel wire sensor is defined by the equation $$\delta_1 = 4L_o^3 Pf^2/Eg = 9775 L_o^3 (1/T_1^2)$$

where $\delta_1$ is the displacement between the ends of the sensor, inches; $L_o$ is the initial gage length between the anchored ends, inches; f is the resonant vibrational frequency, hertz; E is the Young's modulus $30 \times 10^6$ psi; g is the acceleration of gravity of 386 inches per second squared; p is the average density of the sensor per unit length, 0.283 pounds/inch$^3$; and $T_1$ is the Creare vibratory wire meter reading.

The helical wire sensor has greater flexibility than the straight wire sensor so the above equation must be multipled by a correction factor K In addition to the K correction for flexibility, a correction for length is also necessary since this becomes important when the diplacement is not an infinitesimal as for the straight wire sensor.

The required equation for the helical sensor becomes $$(L_o - L)L^3 = KL_o^6 P(1/T_5^2 - 1/T_4^4)/Eg.$$

The meter reading $T_5^2$ and $T_4^2$ correspond to an initial gage length $L_o$ and a second gage length L. In initially deriving the K correction factor, the lengths $L_o$ and L are known and solving the equation produces K. The resulting correction factor K can then be subsequently used in the equation for determining the variable gage length, which is the only unknown in the equation.

That the equation is correct is evident from the fact that in all the tests to date with a flexibility of 500 or less the average coefficient of determination has been about 0.9985. This means that the equation for L is linear within the experimental error in the tests. That is, the estimated gage length is a linear function of the true length. There may be times when an experimental calibration of the sensor is necessary or desirable.

I claim:
1. A method for manufacturing and calibrating a helical wire sensor, which comprises the steps of:
   (a) winding a small diameter high strength wire into a helical coil;
   (b) applying a first elongation to the coil to form a helical sensor of a selected geometry, with a given flexibility, elastic displacement range, and sensitivity which is inversely proportional to the displacement range;
   (c) determining a vibratory more for the elongated coil having such selected geometry;
   (d) applying a second elongation to the coil which is less than the first, and obtaining a second vibratory mode determination; and
   (e) comparing said first and second vibratory modes to corresponding displacements to calibrate the helical wire sensor prior to use.

* * * * *